United States Patent [19]
Blair et al.

[11] 3,874,621
[45] Apr. 1, 1975

[54] RECORDING SYSTEM USING GAS LASER

[75] Inventors: Lloyd R. Blair, Phoenix; Robert E. Meyer, Glendale, both of Ariz.; Dennis H. Rose, San Jose, Calif.; James E. Smith, Boulder, Colo.; Jack E. Steinfeldt, Buckeye, Ariz.

[73] Assignee: The United States of America as represented by the Secretary of the United States Army, Washington, D.C.

[22] Filed: Feb. 9, 1970

[21] Appl. No.: 14,821

[52] U.S. Cl. ............... 346/108, 242/183, 226/88, 332/7.51, 346/136
[51] Int. Cl. .......................................... G01d 9/00
[58] Field of Search .......... 346/108, 136; 242/179, 242/182, 183; 226/24, 45, 88, 95; 318/313; 332/7.51

[56] References Cited
UNITED STATES PATENTS
3,154,371 10/1964 Johnson ........................ 346/108
3,203,635 8/1965 Rayfield et al. ................. 346/136
3,265,267 8/1966 Wallin ............................. 226/95 X
3,304,428 2/1967 Peters ............................ 332/7.51
3,392,930 7/1968 Goldfarb ......................... 346/136
3,462,663 8/1969 Schiller ......................... 318/313 X Primary Examiner—Richard A. Farley
Assistant Examiner—N. Moskowitz
Attorney, Agent, or Firm—Nathan Edelberg; Robert P. Gibson; Jeremiah G. Murray

[57] ABSTRACT

A wide band, high density recording system in which a c w gas laser is focused to a very small spot on a film after being modulated by a potassium dihydrogen phosphate crystal modulator. The film is driven by a precision drive, and a precision motor speed and position control is used for driving a rotating mirror which deflects the light beam across the film.

5 Claims, 5 Drawing Figures

RECORDING SYSTEM USING GAS LASER

BACKGROUND OF INVENTION

The present invention relates generally to a recording system and in particular to a wide band, high density system utilizing a c w gas laser. A need has long existed for a wide band, high packing density recorder. In the past the cathode ray tube recorder has been used in attempts to fill these requirements. The cathode ray devices cannot however achieve the high packing density that is capable of a laser because it cannot be focused to small enough spots. The development of the laser with its high intensity, coherent output makes it possible to write very small spots on film at high speeds.

SUMMARY OF INVENTION

The general purpose of the invention is to provide a recording system which embraces all the advantages of similarly employed devices and passes none of the disadvantages. To obtain this the present invention contemplates the use of a continuous wave gas laser as a light source in a recording system. To utilize the laser in a wide band, high speed, high packing density recording system the development of several sub-systems and techniques was necessary. These include a wide band light intensity modulator, a high speed rotating mirror for beam deflection, a mirror speed and position control and a film handling and transport system. Each of these systems will be described.

DESCRIPTION OF DRAWINGS

The exact nature of this invention will be readily apparent from consideration of the following specification relating to the annexed drawings in which.

DESCRIPTION OF PREFERRED EMBODIMENT

Figure 1:
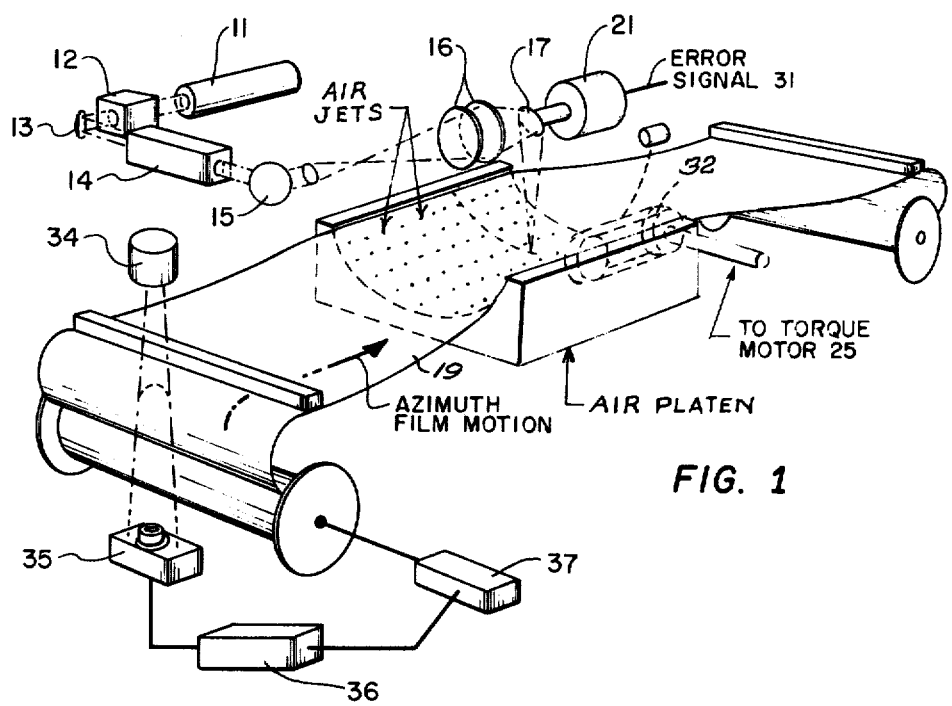
FIG. 1 is a perspective view of the entire recorder system.

Referring now to the drawing wherein like reference characters designate corresponding parts in the several views, there is shown in FIG. 1 a high intensity coherent light source 11. In the developed system a Spectra Physics Model 115 gas laser emitting 6 milliwatts of power in a 2 millimeter beam was used. The 2 millimeter beam is next passed through a beam shrinking lens system 12 which reduces the 2 millimeter beam into a 1 millimeter coherent beam which is compatible with the small cross section of the crystals in light modulator 14. A 45° mirror shown as 13 is used to fold the beam and direct it to a crystal video light modulator 14. The crystal light modulator must be capable of modulating over a wide band of video frequencies without destroying the coherence of the light beam. A uniaxial cubic crystal of potassium dihydrogen phosphate (KDP) is birefringent (double refractive) and was found to be adequate if implemented properly. The light modulator in the rotating mirror laser recorder of this invention employs two 45° z-cut KDP crystals operating in the transverse mode. After the crystals are cut they are oriented in the light modulator with light propagating along the y' axis in one crystal and along the x' axis in the other crystal. The varying voltage that causes changes in light modulation is applied across both crystals in the z direction. It is necessary to use two crystals in series to cancel the effects of the natural birefringence of the crystals and to eliminate problems associated with divergence of the beam. After light modulation the beam is again folded by another 45° mirror 15. The light modulated beam is then passed to an F 4.5 diffraction relay lens 16 which converts the parallel ray 1 millimeter beam into a converging beam that focuses to a 0.157 millinch half power spot diameter. this lens system is composed of a 63x microscope objective lens followed by two aspheric lens. The light then impinges on scanning mirror 17. Since the system is designed to operate at high scanning rates the mirror rotation rate must be high. In the model built the rate was 40,000 RPM. The mirror is a single surface mirror with the face oriented at an angle of 45° to the axis of the drive motor shaft. Light impinging on the mirror has an axis that is collinear with the center line of the motor shaft. Operation in this manner allows the area of the mirror surface to be presented to the light beam and to form the image across the entire width of the film. As a result, the spot size is constant over the full film width. Beryllium is used as the mirror surface because of its dimensional stability under mechanical stress. A beryllium rod is cut at a 45° angle and a mirrored surface placed thereon. From the mirror surface the image is then focused on film 19.

Figure 4:
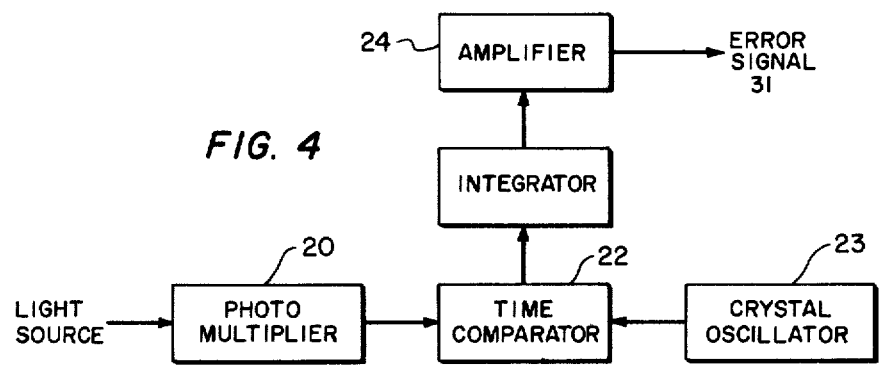
FIG. 4 shows a schematic diagram of the scanner synchronization control.

To make a recorder of the type described, it must be possible to synchronize the data to the scanner rotational rate. The technique employed, shown in FIG. 1 and FIG. 4, is to require the scanner to emit a pulse every rotation and at a prescribed amount of time later the information to be recorded is fed in and is written in lines across the film.

The scanner mirror is driven by a two phase induction electric motor 21. The speed of the motor is changed by changing the voltage of the two drive signals applied to the motor. The error signal, which is used to correct the motor speed by changing the applied voltage is derived from pulses of light emerging from a slit located in the circle defining the focus of the rotating mirror. Each rotation of the mirror applies light to the slit which impinges on a photomultiplier tube 20. The output of the photomultiplier is fed to a time comparator circuit 22. A very stable chain of pulses derived from a crystal stabilized oscillator 23 is also fed into the time comparator. Thus the time interval between adjacent slit pulses is compared with the time interval of the crystal oscillator derived pulses. The comparator output is integrated, and used to change the gain of an amplifier 24 driving the scanner motor. The signal change thus changes the motor speed. The degree of synchronization can be seen to be related to the stability of the reference pulse train and the accuracy to which the time difference can be measured in the comparator.

This scanner was designed to operate at a fixed rotational rate. It can be seen, however, that the speed could be varied by changing the frequency of the reference. As the reference frequency changes, the mirror rate would also change within the bandwidth limits of the system.

Figure 5:
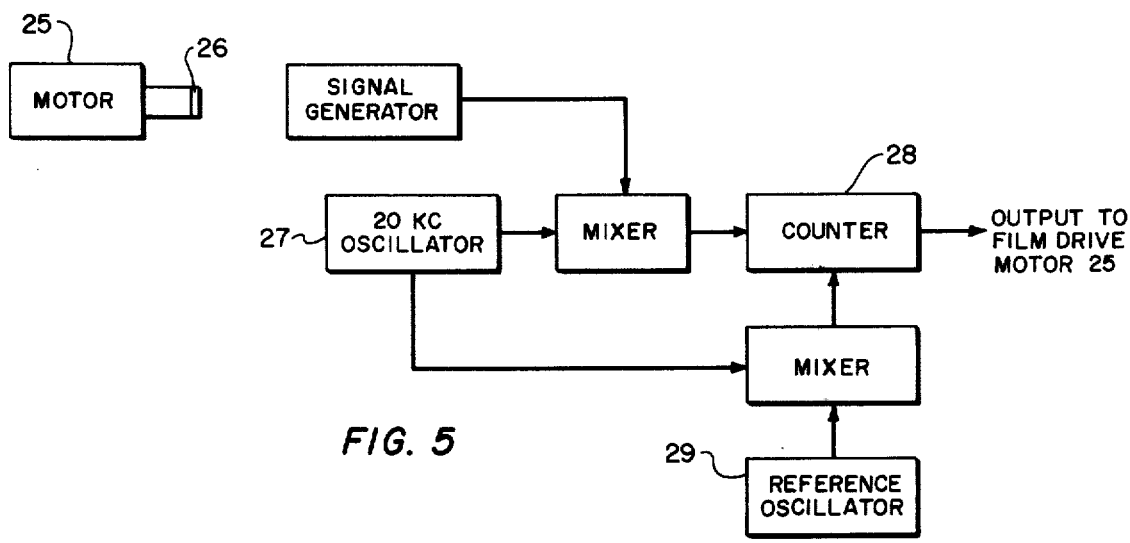
FIG. 5 shows a schematic diagram of control used to move the film past the exposure area.

An optically synchronized torque motor is the prime mover of the film past the exposure area. The film speed is controlled by the use of an optically generated frequency. As shown in FIG. 1 and FIG. 5 a circular glass disc 26 with an etched grating near the circumference is attached to the film drive motor shaft. A replica of the disc grating is mounted close to the grating and light is applied to the grating. Two photo pick-offs are located such that they each receive light that is sine wave intensity modulated and the modulation on the light at the two pick-offs is in phase quadrature. For this system a 5,000 cycle sine and cosine signal is generated for each revolution of the motor shaft. This signal is mixed with a 20 KC local oscillator 27 signal and is used to count down a counter 28. Then a reference oscillator 29 is also mixed with the 20 KC signal and is used to count the counter up. A three state counter is used and the relative time spent in the one and three position represent the relative forward and backward signal that the motor receives. The film drive speed can be changed by changing the frequency of the reference oscillator.

It is desirable to meter the film accurately in the vicinity of the film exposure and to do it without stressing or scratching the film. The method that has been employed is to have the motor drive a belt 32 that is able to attach itself to the film using vacuum techniques. A special perforated belt is used which runs across an evacuated cavity. This assembly is placed in close proximity to the film near the exposure point which causes the film to be drawn down on the belt to seal the perforations. As the perforations pass the end of the vacuum cavity, the film is released from the belt and the belt continues on over the idler roller. To minimize film scratching, the belt is coated with a high friction rubber material.

One of the most unique features of the recorder in this patent disclosure is the air film platen. The curved platen is required because the point of focus of the rotating mirror is on a circle whose center is on the mirror axis of rotation. The general configuration is shown schematically in FIG. 1. The film is stored on two flat rollers but, as discussed above, must be shaped in the form of a partial cylinder at the point of exposure. This transition must be made without stressing the film. Abrasion with consequent scratching of the film and tension necessary for film transport have always been trouble areas in film recorder designs. The recorder in this patent disclosure incorporates techniques that attempt to eliminate abrasion and minimize inertia in the film handling equipment. These attempts resulted in an air film platen. Abrasion of the film surface is completely eliminated by many small air jets which serve both to confine the film to the desired plane and simultaneously provide an air bearing which prevents contact. These air jets are used to form straight guides on feed and take-up ends of the transport as well as to form a relatively long cylindrical film shape in the area to be exposed. The film is completely unrestrained between the straight guides and the exposure platen and between the guides and the film storage spools so that the film might make these contour changes with minimum stress and deformation. The technique for constraining the film to a partial cylindrical shape using forced air employs the Bernoulli principle. That is: the film is brought in close proximity to the cylindrical surface composed of many air jets. Air is forced through these jets and must exhaust between the film and the surface of the platen into the surrounding volume. The air must have an increased velocity between the film and the jets and hence the air pressure is reduced. The ambient air then pushes the film against the platen; however, there is a layer of air between the film and the platen forming an air bearing to prevent scratching.

Figure 2:
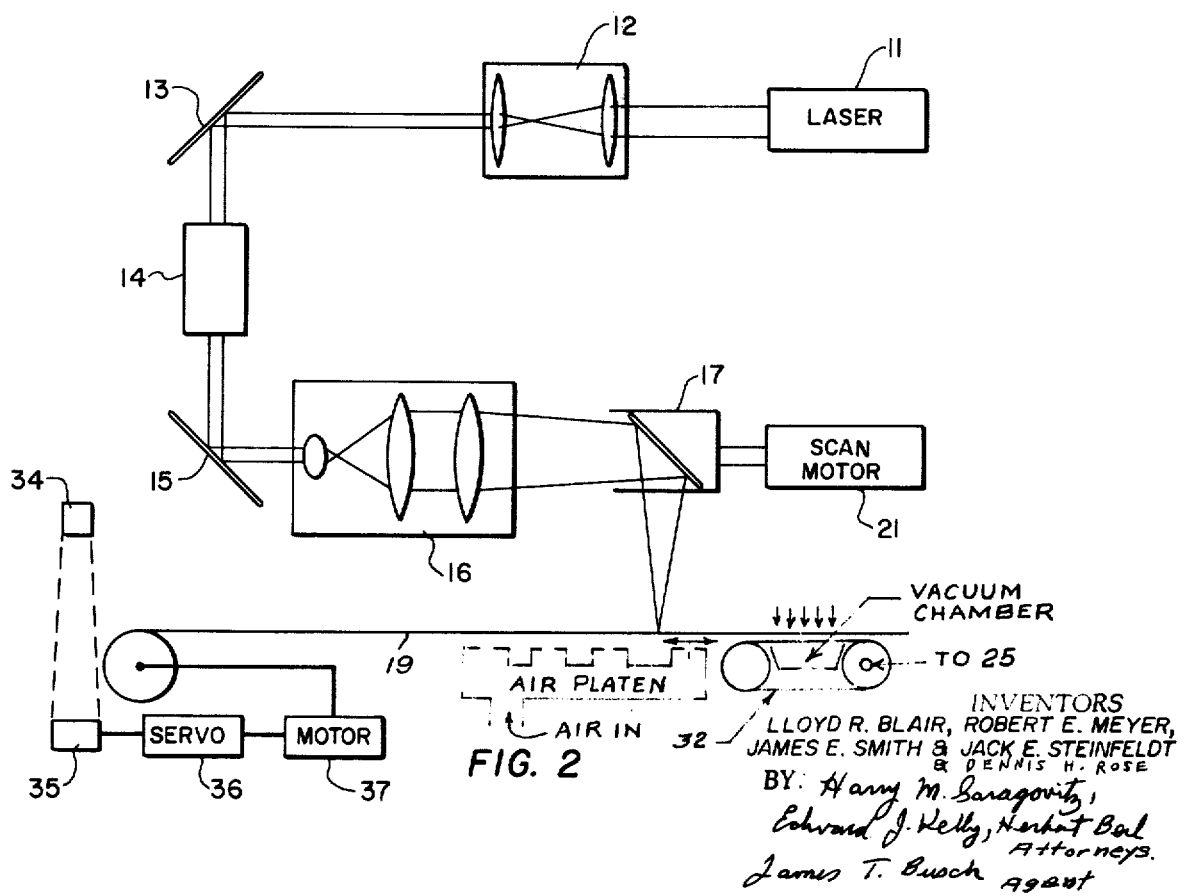
FIG. 2 shows a schematic diagram of the recorder.
Figure 3:
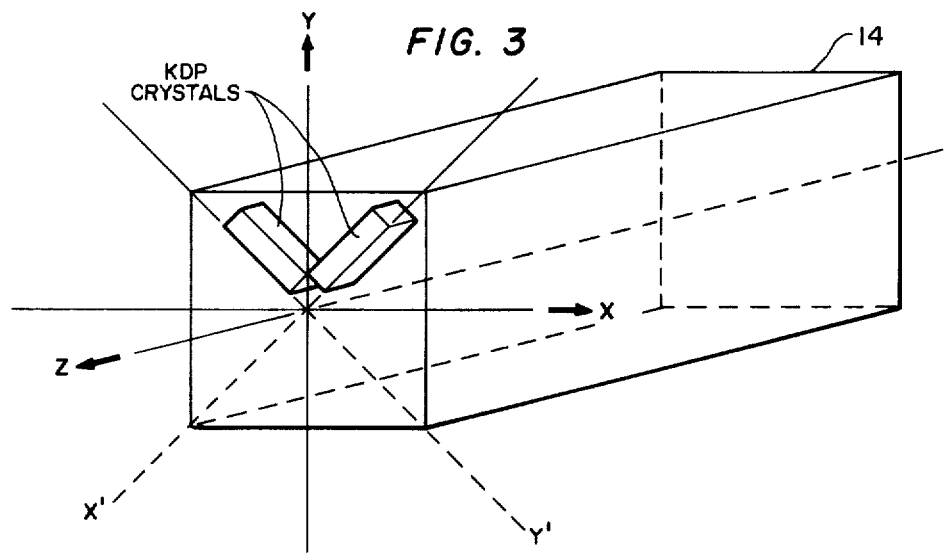
FIG. 3 shows a perspective view of the crystal cuts for the light modulator shown in FIGS. 1 and 2.

As shown in FIG. 1 and FIG. 2 a free loop of film is formed immediately after the film supply roller and prior to the take-up roller. This is done so that the film metering motor does not put tension on the film by pulling it off the roller and also so that the take-up roller does not pull on the film in the vicinity of exposure. The free loop is formed by optically monitoring the loop size. This is accomplished by the use of an infrared light beam 34 which traverses the area the loop should occupy. A photo detector 35 senses the light beam and a servo control 36 drives a dc torque motor 37 to maintain a preset light level which corresponds to the film loop center.

It should be understood, of course, that the foregoing disclosure relates to only a preferred embodiment of the invention and that numerous modifications or alterations may be made therein without departing from the spirit and the scope of the invention as set forth in the appended claims.

What is claimed is:

1. A wide band recording system comprising:
   a continuous wave gas laser for producing a laser beam;
   a crystal light modulator through which said laser beam is focused;
   a scanning mirror onto which the modulated laser beam impinges;
   a first synchronization means to control the scanning mirror rotational rate;
   a film onto which said modulated laser beam is focused by said scanning mirror;
   a second synchronization means to control the rate at which the film is moved past said scanning mirror, said second synchronization means consisting of a 20 KC local oscillator having a first and a second output, a signal generator for receiving an optically generated signal off the shaft of a film motor and producing an electrical output of the same frequency as said optically generated signal, a first mixer circuit having two inputs and an output wherein the electrical output from said signal generator and the first output from said 20 KC local oscillator are applied separately to each of said two inputs, a second mixer having a first and a second input and an output, a reference oscillator having an output applied to the first input of said second mixer and the second output from said 20 KC local oscillator applied to the second input of said second mixer, and a counter having a first and a second input and an output wherein the output from said first mixer is applied to the first input of said counter as a count down and the output of said second mixer is applied to the second input of said counter as a count up wherein the output from said counter controls the speed of said film motor;
   an air film platen to shape said film into cylindrical form as it passes the exposure point; and
   an optically controlled monitoring means to control the film loop as it comes off the film roll.

2. The circuit of claim 1 in which the crystal light modulator consists of two uniaxial cubic crystals of potassium dihydrogen phosphate.

3. The circuit of claim 2 in which the first synchronization means consists of a crystal oscillator,
a photomultiplier tube,
a time comparator,
an integrator and,
an amplifier used to produce an error signal,
said crystal oscillator and photomultiplier connected to said time comparator,
said time comparator connected to said integrator; and
said integrator connected to said amplifier.

4. The circuit of claim 2 in which said air film platen is formed by using small air jets to obtain said cylindrical shape.

5. The circuit of claim 3 in which said monitoring means consists of an infrared beam which traverses the area the film loop should occupy,
a photo detector to sense said infrared beam,
a servo control connected to said infrared sensor, and,
a torque motor to which said servo is connected and which is used to drive the film supply roll.

* * * * *